US011199831B2

(12) United States Patent
Srivastava et al.

(10) Patent No.: US 11,199,831 B2
(45) Date of Patent: Dec. 14, 2021

(54) TOOLPATH ADJUSTMENTS BASED ON 3-DIMENSIONAL SCAN DATA OF PHYSICALLY MANUFACTURED PARTS

(71) Applicant: Siemens Industry Software Ltd., Tel Aviv (IL)

(72) Inventors: Sanjeev Srivastava, Princeton Junction, NJ (US); Sudipta Pathak, Lawrence, NJ (US); Erhan Arisoy, Princeton, NJ (US); Gil Chen, Bnai Zion (IL); Eduard Finaro, Petach Tikva (IL); Suraj Ravi Musuvathy, Princeton, NJ (US); Guannan Ren, Monmouth Junction, NJ (US)

(73) Assignee: Siemens Industry Software Ltd., Tel Aviv (IL)

( * ) Notice: Subject to any disclaimer, the term of this patent is extended or adjusted under 35 U.S.C. 154(b) by 0 days.

(21) Appl. No.: 16/437,790

(22) Filed: Jun. 11, 2019

(65) Prior Publication Data
US 2019/0391562 A1  Dec. 26, 2019

Related U.S. Application Data

(60) Provisional application No. 62/687,447, filed on Jun. 20, 2018.

(51) Int. Cl.
  *G05B 19/4099*  (2006.01)
(52) U.S. Cl.
  CPC ............ *G05B 19/4099* (2013.01); *G05B 2219/35134* (2013.01); *G05B 2219/39271* (2013.01); *G05B 2219/49007* (2013.01)
(58) Field of Classification Search
  None
  See application file for complete search history.

(56) References Cited

U.S. PATENT DOCUMENTS

| 4,958,245 A * | 9/1990 | Roth | G11B 5/584 360/77.03 |
| 2004/0049312 A1 | 3/2004 | Bender | |
| 2010/0023157 A1 | 1/2010 | Burgess et al. | |

FOREIGN PATENT DOCUMENTS

WO  2007099526 A1  9/2007

OTHER PUBLICATIONS

Noureddine Azzam et al., "Adaption of machining toolpath to distored geometries: application to remove a constant thickness on rough casting prostheses", International Journal of Advanced Manufacturing Technology, Springer Verlag, 2014, vol. 72, pp. 1073-1083.

(Continued)

*Primary Examiner* — Carlos R Ortiz Rodriguez

(57) ABSTRACT

A computing system may include a data access engine and a toolpath adjustment engine. The data access engine may be configured to access a computer-aided design (CAD) model of a part design and a computer-aided manufacturing (CAM) setup for the part design. The CAM setup may include a nominal toolpath specified through the CAD model for performing a finishing operation for the part design. The data access engine may also be configured to obtain 3-dimensional (3D) scan data for a physical part manufactured from the part design. The toolpath adjustment engine may be configured to extract, from the 3D scan data, a manufactured geometry of the physical part manufactured from the part design and generate an adjusted toolpath for the physical part to account for the manufactured geometry extracted from the 3D scan data.

20 Claims, 5 Drawing Sheets

(56) References Cited

OTHER PUBLICATIONS

Jeremy Belchior et al., "Off-line compensation of the tool path deviations on robotic machining: Application to incremental sheet forming", Robotics and Computer-Integrated Manufacturing, Elsevier, 2013, vol. 29(4), pp. 58-69.

\* cited by examiner

TOOLPATH ADJUSTMENTS BASED ON 3-DIMENSIONAL SCAN DATA OF PHYSICALLY MANUFACTURED PARTS

CROSS REFERENCE TO RELATED APPLICATION

This application claims the benefit of priority to U.S. Provisional Application No. 62/687,447, filed on Jun. 20, 2018 and titled "ROBOT BASED AUTOMATIC FINISHING OF MANUFACTURED PARTS", which is incorporated herein by reference in its entirety.

BACKGROUND

Computer systems can be used to create, use, and manage data for products and other items. Examples of computer systems include computer-aided design (CAD) systems (which may include computer-aided engineering (CAE) systems), computer-aided manufacturing (CAM) systems, visualization and manufacturing systems, product data management (PDM) systems, product lifecycle management (PLM) systems, and more. These systems may include components that facilitate the design and simulated testing of product structures and product manufacture.

BRIEF DESCRIPTION OF THE DRAWINGS

Certain examples are described in the following detailed description and in reference to the drawings.

DETAILED DESCRIPTION

The discussion herein refers to finishing operations for parts. Finishing operations (which may also be referred to as finishing processes) may include any post-manufacture process performed on a part or product. Finishing operations may be used to address part imperfections or part variances resulting from manufacturing processes used to construct a part. For instance, casting and 3D printing processes may result in variations and imperfections between manufactured parts, including those of the same design. Finishing operations may be utilized to address such issues and standardize part structures, and examples of finishing operations include processes for edge deburring, blasting, burnishing, grinding, milling and more.

In some instances, finishing operations are performed via robots or other mechanical finishing systems, and modern CAD and CAM systems may support simulation of finishing operations through specified toolpaths that operate on CAD models of part designs. However, virtual toolpath simulations may not be completely accurate in representing physically manufactured products subject to variance and imperfections, which may result in ineffective part finishing. Robotic programming to adjust or correct part finishing operations can be tedious and difficult, often requiring manual interference of part production to configure robots with the specific paths and finishing parameters to accurately perform the finishing operation on a given part.

The disclosure herein may provide systems, methods, devices, and logic for toolpath adjustments based on 3D scan data of physically manufactured parts. As described in greater detail herein, 3D scan data of physically manufactured parts may be analyzed to extract as-manufactured geometries of manufactured parts. By comparing the 3D scan data to a corresponding CAD model, manufacturing defects can be identified from the actual geometry of the manufactured part, from which an adjusted (e.g., corrected) toolpath can be configured for robot-based finishing operations. Moreover, the toolpath adjustment features described herein may support comparisons between as-manufactured CAD representations of a manufactured part, from which a toolpath can be adjusted or created to perform finishing operations with increased accuracy. The toolpath adjustment features described herein may be part-agnostic in that these features may be applicable to any type of part design or finishing operation. As such, the toolpath adjustment features described herein may provide an automated and flexible CAD/CAM process that may support performing finishing operations on manufactured parts with increased efficiency.

These and other toolpath adjustment features and technical benefits are described in greater detail herein.

Figure 1:
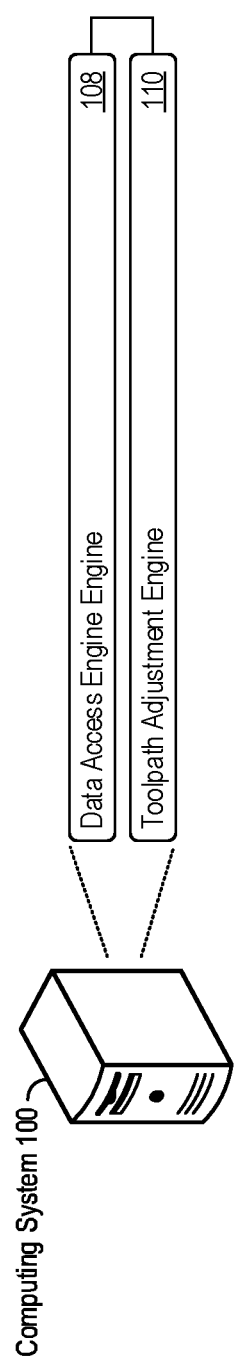
FIG. 1 shows an example of a computing system that supports toolpath adjustments based on 3-dimensional (3D) scan data of physically manufactured parts.

FIG. 1 shows an example of a computing system 100 that supports toolpath adjustments based on 3D scan data of physically manufactured parts. The computing system 100 may take the form of a single or multiple computing devices such as application servers, compute nodes, desktop or laptop computers, smart phones or other mobile devices, tablet devices, embedded controllers, and more. In some examples, the computing system 100 implements or executes a CAD/CAM application, which may provide design, simulation, and analysis capabilities for the manufacture and finishing of part designs.

As an example implementation to support any combination of the toolpath adjustment features described herein, the computing system 100 shown in FIG. 1 includes a data access engine 108 and a toolpath adjustment engine 110. The computing system 100 may implement the engines 108 and 110 (including components thereof) in various ways, for example as hardware and programming. The programming for the engines 108 and 110 may take the form of processor-executable instructions stored on a non-transitory machine-readable storage medium and the hardware for the engines 108 and 110 may include a processor to execute those instructions. A processor may take the form of single processor or multi-processor systems, and in some examples, the computing system 100 implements multiple engines using the same computing system features or hardware components (e.g., a common processor or a common storage medium).

In operation, the data access engine 108 may access a CAD model of a part design and a CAM setup for the part design, the CAM setup including a nominal toolpath specified through the CAD model for performing a finishing operation for the part design. The data access engine 108 may also obtain 3D scan data for a physical part manufactured from the part design. In operation, the toolpath adjustment engine 110 may extract, from the 3D scan data, a manufactured geometry of the physical part manufactured from the part design and generate an adjusted toolpath to account for the manufactured geometry extracted from the 3D scan data.

These and other toolpath adjustment features according to the present disclosure are described in greater detail next.

Figure 2:
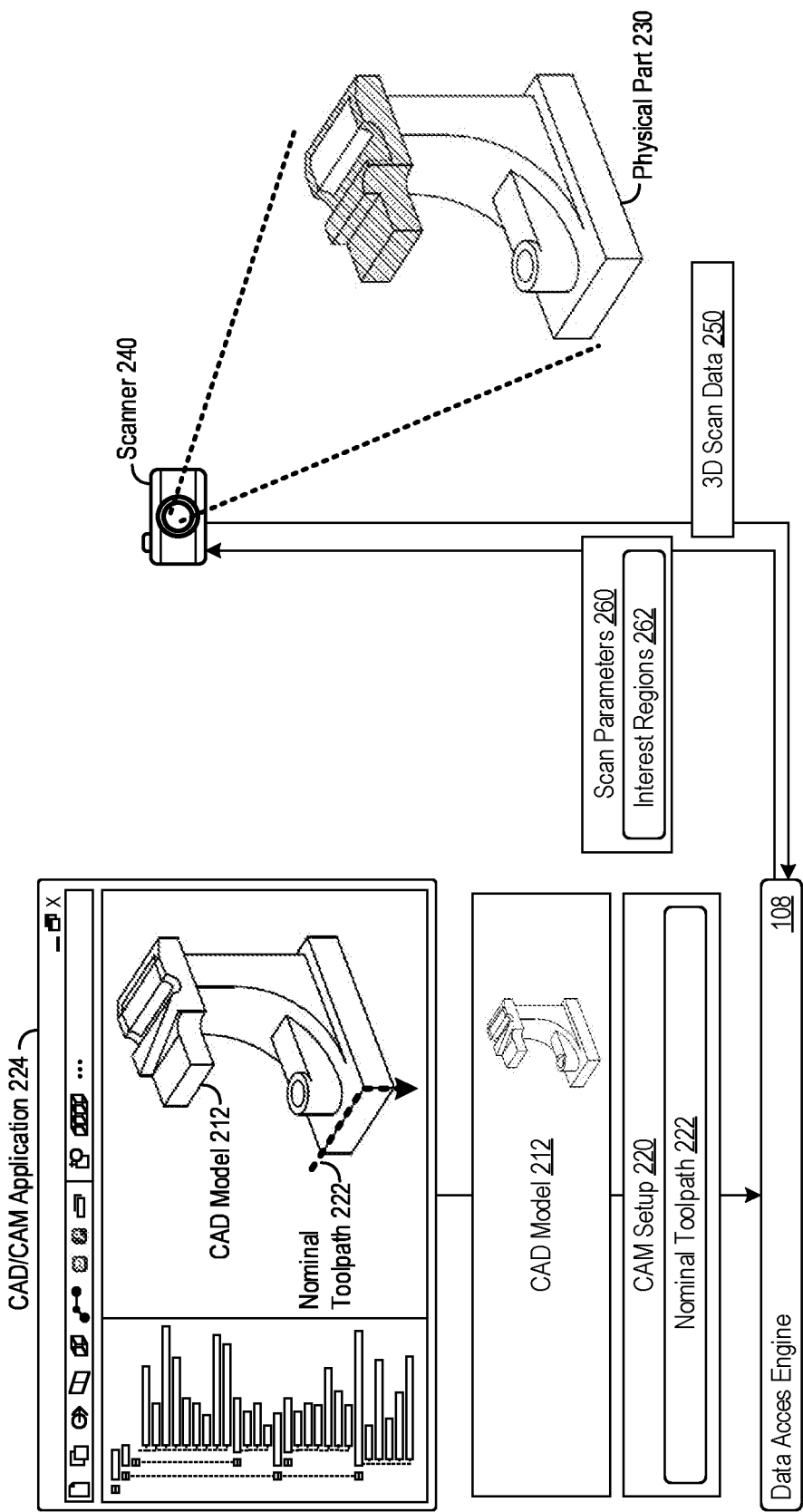
FIG. 2 shows an example access of 3D scan data of a physical part by a data access engine.

FIG. 2 shows an example access of 3D scan data of a physical part by the data access engine 108. To support toolpath adjustments based on physically manufactured parts, the data access engine 108 may implement various data access capabilities, including capabilities to access a 3D CAD model of a part design and 3D scan data of a physical part manufactured from the part design. Each of these data access capabilities are described in turn.

In FIG. 2, the data access engine 108 accesses a CAD model 212 as well as a CAM setup 220 for the CAD model 212. The CAD model 212 may take the form of any 3D representation of a part design. The CAM setup 220 may include any manufacturing parameters for the part design, including toolpaths and parameters for any number of finishing operations to perform on the part design after manufacture. In the example shown in FIG. 2, the CAM setup 220 includes a nominal toolpath 222, which may be a configured toolpath for a particular finishing operation to perform for the CAD model 212. A nominal toolpath may refer to a toolpath specified based on a virtually designed geometry of the CAD model 212, as opposed to toolpaths design for the actual (as-manufactured) geometry of a physically-manufactured part. As one example used herein, the nominal toolpath 222 may refer to a toolpath for an edge deburring operation. However, any number of nominal toolpaths of any type of finishing operation are contemplated herein. Also as used herein, a nominal toolpath need not include a path at all. Instead, the nominal toolpath may include a set of part features (e.g., part components, edges, portions, structures, or other part sections) that a finishing operation will operate on. As such, a nominal toolpath may take the form of a set of nominal features (e.g., particular part edges to machine for a deburring operation) at which a given finishing operation will physically alter a part.

In some implementations, the data access engine 108 may be implemented as a component (e.g., a plug-in) of a CAD/CAM application, such as the CAD/CAM application 224 shown in FIG. 2. Accordingly, the data access engine 108 may access CAD models and corresponding CAM setups from local or remote data structures utilized by the CAD/CAM application 224 to design and simulate part designs.

The data access engine 108 may also obtain 3D scan data for a physical part manufactured from the CAD model 212. An example of such a part is shown in FIG. 2 as the physical part 230. 3D scan data of the physical part 230 may be captured by a scanner 240, which may include any number of optical components to support 3D scanning of a physical structure (e.g., shape) of the physical part 230. In some implementations, the scanner 240 may take the form of a handheld scanner or a depth camera.

Captured scans by the scanner 240 may be processed and provided to the data access engine 108 as the 3D scan data 250. The 3D scan data 250 may take any number of forms, such as a point cloud, a stereolithography (STL) file (e.g., of a surface mesh of the physical part 230), or any other data form representative of a surface geometry of the physical part 230. In some implementations, the data access engine 108 receives raw image data from the scanner 240 and processes the raw image data into the 3D scan data 250 in the form a point cloud, triangular surface mesh, or as other geometric representations.

The data access engine 108 may support selective capture, processing, or access of 3D scan data 250 for the physical part 230. Capture, analysis, and processing of image data may be timing-consuming and resource-intensive, especially with increasing image capture resolutions and part complexities. As such, the data access engine 108 may control capture of the 3D scan data 250 to scan some, but not all, portions of the physical part 230. In providing such selective scanning capabilities, the data access engine 108 may provide scan parameters 260 to the scanner 240, and the scan parameters 260 may identify specific portions of the physical part 230 at which 3D scan data 250 is obtained, set various scan configurations (e.g., captured data resolution) of the 3D scan data 250 or raw image data, or control capture, processing, or access of the 3D scan data 250 in any other way.

As one example, the data access engine 108 may provide scan parameters 260 to the scanner 240 to capture image data or 3D scan data 250 specifically (or only) for the portion of the physical part 230 along the nominal toolpath 222 (or a threshold surrounding region, e.g., within a threshold distance from the nominal toolpath 222). As the nominal toolpath 222 may specify particular positions of a part design to traverse in performing a finishing operation (e.g., nominal features), the scan parameters 260 generated by data access engine 108 may specify scanning those specific positions of the physical part 230 (and not other positions of the physical part 230) to acquire the 3D scan data 250. Put another way, the scan parameters 260 may identify the nominal features for a part design, which may control the scanner 240 to capture 3D scan data 250 specifically at the nominal feature portions of the physical part 230.

As image capture technologies continue to improve, even scanning along a nominal toolpath to obtain 3D scan data may require significant processing resources or significantly increase processing latencies. The data access engine 108 may support capture of 3D scan data for selected portions of a nominal toolpath 222, which the data access engine 108 may identify as interest regions along the nominal toolpath 222. The data access engine 108 may identify interest regions as portions of a part design at which a defect could potentially occur during manufacture (e.g., at determined probability greater than a probability threshold) and that would impact the effectiveness, accuracy, or characteristic of a finishing operation for the part design. For such determined interest regions, the data access engine 108 may control a scan of the physical part 230 such that 3D scan data 250 at the interest region is captured at a higher data resolution than at other non-interest regions on the nominal toolpath 222.

In FIG. 2, the scan parameters 260 configured by the data access engine 108 include interest regions 262 in the physical part 230 at which to capture 3D scan data 250 at a higher resolution. In some implementations, the scan parameters 260 specify capture of 3D scan data 250 only at the interest regions 262 and not at other portions of the physical part 230. Explained in a different way, the scan parameters 260 may specify capture of 3D scan data with data resolution capture of "0" at non-interest regions of the physical part 230.

By increasing data resolutions of captured 3D scan data 250 at identified interest regions (or by decreasing data resolutions at non-interest regions), the data access engine 108 may support 3D data capture of relevant portions of the physical part 230 at increased efficiency, for example as compared to brute force scanning techniques. By selectively scanning portions of the physical part 230 at higher data resolutions, the data access engine 108 may maintain an accuracy or effectiveness at which part defects along the nominal toolpath 222 can be identified, but do so with reduced latency and/or computational requirements.

The data access engine 108 may identify the interest regions 262 of a part design in various ways. In some examples, the interest regions 262 may be user-specified. For instance, a part manufacturer may observe recurring defects in manufactured parts along a particular part edge, corner, or other part portion, and such portions may be specifically identified via user-input as interest regions 262 for a part design.

As another example, the data access engine 108 may identify interest regions 262 based on a particular finishing operation applied via a nominal toolpath. The particular finishing operation may perform actions on a part design at specific locations (e.g., nominal part features) of the part design. To illustrate, a finishing operation may include a robotic milling operation at specific part positions on a nominal toolpath, and other portions along the nominal toolpath may specify a motion path for a robot (and do so without physical interaction with the part design). Such milling positions may be specified in the CAM setup 220 of a part design as nominal features of the milling operation. In this illustration, the data access engine 108 may determine the specific part positions at which the robotic milling operations will occur (and, in some implementations, a threshold surrounding part portion) as interest regions 262 whereas other non-milling portions of the nominal toolpath are determined as non-interest regions. In such a manner, the data access engine 108 may extract interest regions 262 from the CAM setup 220 of a part design based on the nominal toolpath 222 and specific finishing operations at different positions of the nominal toolpath 222.

As yet another example, the data access engine 108 may identify specific portions along a nominal toolpath 222 at which a manufacturing defect has a higher probability of occurrence. To determine defect probabilities, the data access engine 108 may perform statistical analyses on any number of part designs as well as identified defects in physical parts manufactured from the part designs. Analyzed part designs may include similarly structured part designs that are manufactured to the same, similar, or common manufacturing processes. Through such statistical analysis processes, the data access engine 108 may produce a statistical model providing defect probabilities for specific part characteristics, attributes, shapes, structures, positions, or according to any other delineating part feature. In some instances, the data access engine 108 may perform such a statistical analysis on part geometries and defect locations of other part designs (besides the CAD model 212) to determine probabilistic defect locations, which may refer to any part location with a defect probability that exceeds a probability threshold (e.g., greater than 45% or any other configurable threshold). Accordingly, the data access engine 108 may identify interest regions 262 as probabilistic defect locations determined via statistical analysis.

In some implementations, the data access engine 108 may determine interest regions 262 via machine-learning. As a training set, the data access engine 108 may aggregate part geometries and defect locations of other part designs and provide the training set to a machine-learning algorithm to generate a machine-learning model that generates defect probabilities for an input part design or toolpath. Portions of an input toolpath that exceed a threshold defect probability may be identified by the data access engine 108 as interest regions 262. As a specific example, the data access engine 108 may provide training data comprising part geometries and defect locations of other part designs to train a neural network and input a part design (e.g., the CAD model 212) to the neural network to identify interest regions 262 along the nominal toolpath 222.

Thus, and in any of the ways described herein, the data access engine 108 may obtain 3D scan data of a physically manufactured part. The 3D scan data may be processed by the toolpath adjustment engine 110 to support toolpath adjustments for the physical part 230, examples of which are described next with reference to FIG. 3.

Figure 3:
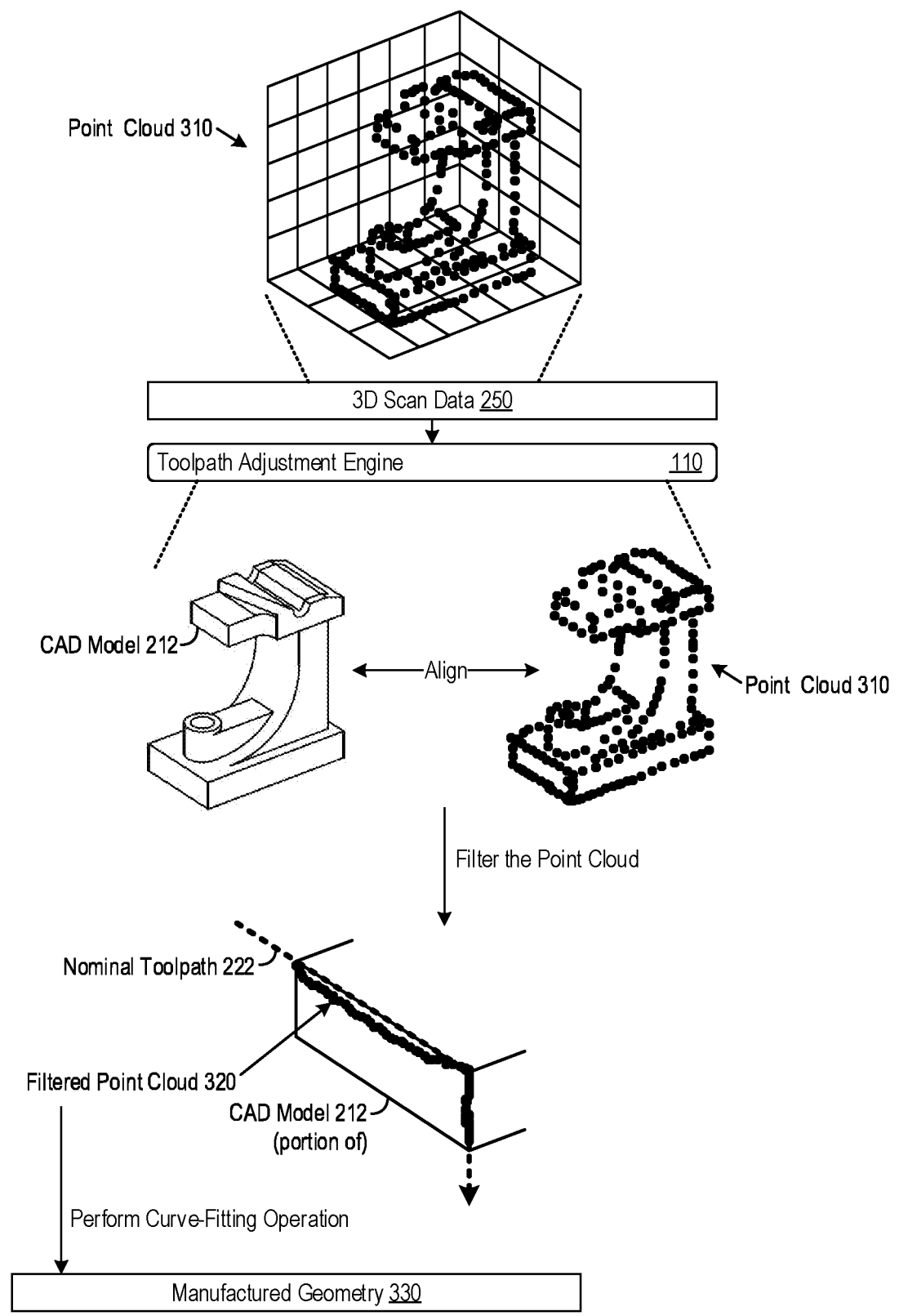
FIG. 3 shows an example determination of manufactured geometry from 3D scan data by a toolpath adjustment engine.

FIG. 3 shows an example determination of manufactured geometry from 3D scan data by the toolpath adjustment engine 110. In FIG. 3, the toolpath adjustment engine 110 processes the 3D scan data 250 (e.g., as described in FIG. 2), which may take the form of a point cloud 310. The point cloud 310 may be implemented as a set of data points in a 3D space, e.g., representative of a manufactured part (or selected portions thereof), such as the physical part 230 shown in FIG. 2. The point cloud 310 is used as a continuing example of a form of 3D scan data 250 in describing FIG. 3. However, the toolpath adjustment engine 110 may consistently implement the features described herein via other forms of 3D scan data 250 as well.

To support toolpath adjustments to account for manufacturing defects in the physical part 230, the toolpath adjustment engine 110 may construct an as-manufactured CAD representation of a physical instance of a part design (e.g., of the physical part 230) from the 3D scan data 250. The as-manufactured CAD representation may include a manufactured geometry of a physical part, and may capture defects or variance introduced by physical manufacture that could affect (e.g., invalidate) a finishing operation to perform for the physical part. By generating an as-manufactured CAD representation, the toolpath adjustment engine 110 may compare the CAD model 212 with the as-manufactured CAD representation. Through such a comparison, the toolpath adjustment engine 110 may identify defects in physical manufacture and adjust the nominal toolpath 222 specified for a virtual design (e.g., the CAD model 212) to account for identified defects in the physical part itself.

To generate an as-manufactured CAD representation of a part design, the toolpath adjustment engine 110 may align the CAD model 212 with the point cloud 310. Such a process may be referred to as a registration process, and the toolpath adjustment engine 110 may employ software-based techniques to directly align the point cloud 310 itself to the same orientation (and optionally, a corresponding size) of the CAD model 212. In other implementations, the toolpath adjustment engine 110 may process the point cloud 310 into an STL format (e.g., a surface mesh) and align the corresponding surface mesh to the CAD model 212. Alignment between surface meshes and CAD models 212 may be done, for example, through application of iterative closest point (ICP) or other iterative algorithms.

By aligning the CAD model 212 to the point cloud 310 (whether directly or indirectly), the toolpath adjustment engine 110 may match specific features of the CAD model 212 to corresponding as-manufactured scan data for the physical part. For the point cloud 310, specific part features (e.g., edges, components, curves, assemblies, etc.) of the physical part may be represented as captured 3D points, which the toolpath adjustment engine 110 may then extract and compare to the CAD model 212 and the nominal toolpath 222 for defect identification and corresponding toolpath adjustments to address identified defects.

In some implementations, the toolpath adjustment engine 110 may filter the point cloud 310 to obtain a filtered point cloud. The toolpath adjustment engine 110 may filter, from the point cloud 310, any 3D scan data (e.g., 3D points in the point cloud 310) deemed unnecessary for defect detection and toolpath adjustments. For instance, the toolpath adjustment engine 110 may filter, from the point cloud 310, any 3D points outside a given threshold distance from a path or plane of the nominal toolpath 222. While the nominal toolpath 222 is not actually a part of the point cloud 310, registration of the CAD model 212 with the point cloud 310 may allow the toolpath adjustment engine 110 to identify specific points in the point cloud 310 that align to the nominal toolpath 222 (and thus allow filtering of point cloud data based on the nominal toolpath 222 specified for the CAD model 212).

Additionally or alternatively, the toolpath adjustment engine 110 may filter, from the point cloud, any features of the physical part (as represented by the point cloud 310) that are not applicable to the finishing operation. For a deburring operation that operates on edges of a physical part, the toolpath adjustment engine 110 may extract edge features from the point cloud 310 and filter non-edges from the point cloud 310. Extraction of edge features in the point cloud 310 may be identified via calculation of point normals (e.g., perpendicular vectors) for given 3D points of the point cloud 310. A given 3D point in the point cloud 310 with a sharp change from one or more neighboring cloud points (e.g., having an angle between normals greater than a threshold angle) may be identified as an edge point by the toolpath adjustment engine 110. Non-edge 3D points in the point cloud 310 may then be filtered by the toolpath adjustment engine 110 accordingly, and in such a way the toolpath adjustment engine 110 may extract edge features from the point cloud 310.

As yet another filtering feature, the toolpath adjustment engine 110 may filter the point cloud 310 based on identified interest regions. The toolpath adjustment engine 110 may identify interest regions in the point cloud 310 in a consistent manner as described herein with respect to interest region determination by the data access engine 108. For instance, the toolpath adjustment engine 110 may determine interest regions along a nominal toolpath 222, identify a portion of the point cloud 310 that corresponds to the nominal toolpath 222, and filter, from the point cloud 310, the non-interest regions of the point cloud 310. As described herein, the toolpath adjustment engine 110 may determine interest regions via user-specification, extraction from CAM setups, statistical analyses, machine learning, or combinations thereof.

To provide an example illustration of point cloud filtering features described herein, FIG. 3 includes a portion of the CAD model 212 overlaid with the nominal toolpath 222. Also shown in FIG. 3 with the portion of the CAD model 212 is a filtered point cloud 320, which may include 3D points in the point cloud 310 determined by the toolpath adjustment engine 110 to be within a threshold distance from the nominal toolpath 222. In that regard, the toolpath adjustment engine 110 may filter, from consideration, portions of 3D scan data inapplicable to analysis and correction of the nominal toolpath 222 and thus obtain the filtered point cloud 320. The filtered point cloud 320 may represent 3D points in the point cloud 310 that form (at least via 3D point data) an as-manufactured scan of a portion of a manufactured physical part that a finishing operation is to be applied to.

From the filtered point cloud 320, the toolpath adjustment engine 110 may determine a manufactured geometry of the physical part. To do so, the toolpath adjustment engine 110 may perform any number of curve fitting operations on the filtered point cloud 320 to extract the manufactured geometry. Applied curve operations may include linear or spline-based fit operations to connect the various points of the filtered point cloud 310. In FIG. 3, the toolpath adjustment engine 110 extracts the manufactured geometry 330 from the filtered point cloud 320. The manufactured geometry 330 may take the form of a curve representative of an as-manufactured geometry of a physical part that corresponds to a path of the nominal toolpath 222 specified for the CAD model 212.

Via the manufactured geometry 330, the toolpath adjustment engine 110 may generate an adjusted toolpath for the physical part 230, one that accounts for the manufactured geometry 330 extracted from the 3D scan data 250. That is, instead of configuring a finishing operation to be performed along the nominal toolpath 222 set for a virtual (e.g., ideal) representation of a part design, the toolpath adjustment engine 110 may set the toolpath to perform the finishing operation based on the as-manufactured physical part. The manufactured geometry 330 may provide a CAD-based representation of the physical part, from which the toolpath adjustment engine 110 may generate the adjusted toolpath. The adjusted toolpath generated by the toolpath adjustment engine 110 may account for any manufactured defects and variance present in the physical part 230, which may increase the accuracy at which finishing operations are performed on actual parts.

In some implementations, the toolpath adjustment engine 110 may utilize robot software to automate the design, simulation, optimization, and programming of robots to perform the finishing operation on the physical part 230. The toolpath adjustment engine 110 may support automatic generation and loading robot parameters based on the adjusted toolpath, which may increase the efficiency at which a finishing operation can be performed on the physical part 230.

As described herein, the data access engine 108 and toolpath adjustment engine 110 may support a toolpath based on 3D scan data of physically manufactured parts. The toolpath adjustment features described herein may be part-agnostic in that the data access engine 108 and toolpath adjustment engine 110 may provide the toolpath adjustment features described herein across a variety of part types, shapes, complexities, and configurations.

Also, the toolpath adjustment features provided herein may increase the efficiency at which such toolpath adjustments can be performed. Through interest region determinations, filtering of 3D scan data, selective scanning and 3D scan data processing, and other aspects, the toolpath adjustment features described herein may intelligently and efficiently identify and localize defects along a nominal toolpath, e.g., as compared to brute force techniques that may require increased time and computing resources to (unnecessarily or inefficiently) collect and/or process 3D scan data of a physical part. Brute force scanning and processing of physical parts may be time-consuming and expensive, and the toolpath adjustment features described herein may, in comparison, require lesser amounts of processing resources and increase the speed at which toolpath adjustments are determined.

Figure 4:
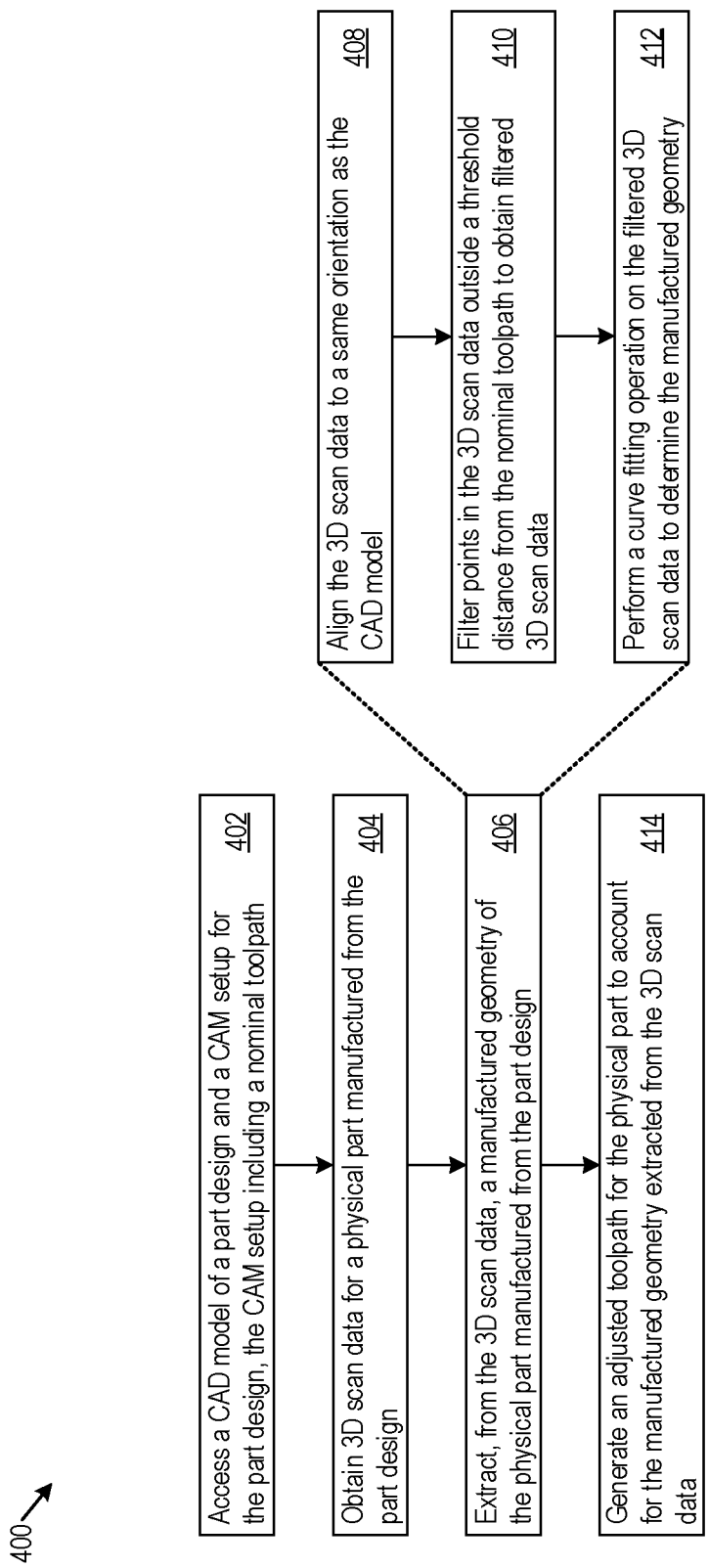
FIG. 4 shows an example of logic that a system may implement to support toolpath adjustments based on 3D scan data of physically manufactured parts.

FIG. 4 shows an example of logic 400 that a system may implement to support toolpath adjustments based on 3D scan data of physically manufactured parts. For example, the computing system 100 may implement the logic 400 as hardware, executable instructions stored on a machine-readable medium, or as a combination of both. The computing system 100 may implement the logic 400 via the data access engine 108 and the toolpath adjustment engine 110, through which the computing system 100 may perform or execute the logic 400 as a method to support toolpath adjustments based on 3D scan data of physically manufactured parts. The following description of the logic 400 is provided using the data access engine 108 and the toolpath adjustment engine 110 as examples. However, various other implementation options by systems are possible.

In implementing the logic 400, the data access engine 108 may access a CAD model of a part design and a CAM setup for the part design, the CAM setup including a nominal toolpath (402). The data access engine 108 may also obtain 3D scan data for a physical part manufactured from the part design (404), doing so according to any of the ways described herein. For instance, the data access engine 108 may obtain 3D scan data for selected portions of the physical part, such as specifically along a portion of the physical part corresponding to the nominal toolpath (e.g., within a threshold distance). Additionally or alternatively, the data access engine 108 may determine interest regions along the nominal toolpath, and specifically target obtaining of 3D scan data for determined interest regions (whether at a higher data resolution, by filtering or discarding 3D scan data from other non-interest regions of the physical part, or the like). Accordingly, the data access engine 108 may obtain 3D scan data for selected portions of the physical part, which may support defect identifications and toolpath adjustments with increased efficiency and accuracy.

In implementing the logic 400, the toolpath adjustment engine 110 may extract, from the 3D scan data, a manufactured geometry of the physical part manufactured from the physical design (406). To do so, the toolpath adjustment engine 110 may align the 3D scan data to a same orientation as the CAD model (408) and filter points in the 3D scan data outside a threshold distance from the nominal toolpath to obtain filtered 3D scan data (410). The 3D scan data may take the form of a point cloud in some instances, and the toolpath adjustment engine 110 may filter the point cloud in such a manner. Then, the toolpath adjustment engine 110 may perform a curve fitting operation on the filtered 3D scan data (e.g., filtered point cloud) to determine the manufactured geometry (412). In implementing the logic 400, the toolpath adjustment engine 110 may also generate an adjusted toolpath for the physical part to account for the manufactured geometry extracted from the 3D scan data (414).

The logic 400 shown in FIG. 4 provides but one example by which a computing system 100 may support toolpath adjustments based on 3D scan data of physically manufactured parts. Additional or alternative steps in the logic 400 are contemplated herein, including according to any features described for the data access engine 108, toolpath adjustment engine 110, or any combinations thereof.

Figure 5:
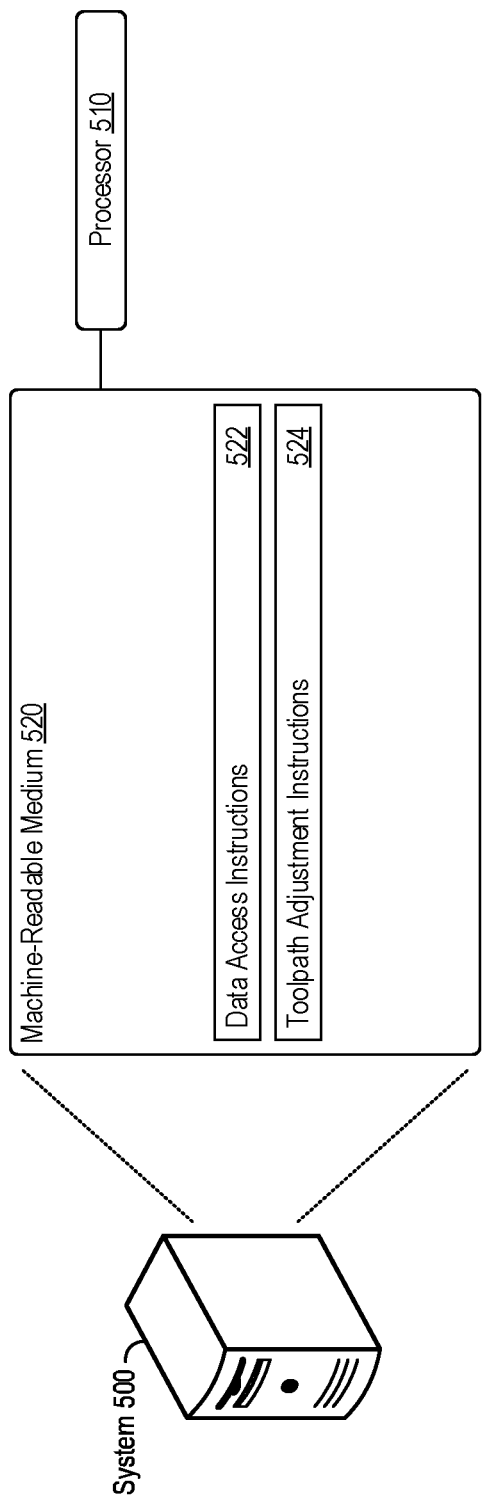
FIG. 5 shows an example of a system that supports toolpath adjustments based on 3D scan data of physically manufactured parts.

FIG. 5 shows an example of a system 500 that supports toolpath adjustments based on 3D scan data of physically manufactured parts. The system 500 may include a processor 510, which may take the form of a single or multiple processors. The processor(s) 510 may include a central processing unit (CPU), microprocessor, or any hardware device suitable for executing instructions stored on a machine-readable medium. The system 500 may include a machine-readable medium 520. The machine-readable medium 520 may take the form of any non-transitory electronic, magnetic, optical, or other physical storage device that stores executable instructions, such as the data access instructions 522 and the toolpath adjustment instructions 524 shown in FIG. 5. As such, the machine-readable medium 520 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The system 500 may execute instructions stored on the machine-readable medium 520 through the processor 510. Executing the instructions (e.g., the data access instructions 522 and/or the toolpath adjustment instructions 524) may cause the system 500 to perform any of the toolpath adjustments based on 3D scan data of physically manufactured parts features described herein, including according to any of the features with respect to the data access engine 108, the toolpath adjustment engine 110, or a combination of both.

For example, execution of the data access instructions 522 by the processor 510 may cause the system 500 to access a CAD model of a part design and a CAM setup for the part design, the CAM setup including a nominal toolpath specified through the CAD model for performing a finishing operation for the part design as well as obtain 3D scan data for a physical part manufactured from the part design. Execution of the toolpath adjustment instructions 524 by the processor 510 may cause the system 500 to extract, from the 3D scan data, a manufactured geometry of the physical part manufactured from the part design and generate an adjusted toolpath for the physical part to account for the manufactured geometry extracted from the 3D scan data.

Any additional or alternative features as described herein may be implemented via the data access instructions 522, toolpath adjustment instructions 524, or a combination of both.

The systems, methods, devices, and logic described above, including the data access engine 108 and the toolpath adjustment engine 110, may be implemented in many different ways in many different combinations of hardware, logic, circuitry, and executable instructions stored on a machine-readable medium. For example, the data access engine 108, the toolpath adjustment engine 110, or combinations thereof, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine-readable instructions stored on the medium, which when executed in an endpoint, computer system, or other device, cause the device to perform operations according to any of the description above, including according to any features of the data access engine 108, the toolpath adjustment engine 110, or combinations thereof.

The processing capability of the systems, devices, and engines described herein, including the data access engine 108 and the toolpath adjustment engine 110, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A method comprising:
by a computing system:
accessing a computer-aided design (CAD) model of a part design and a computer-aided manufacturing (CAM) setup for the part design, the CAM setup including a nominal toolpath specified through the CAD model for performing a finishing operation for the part design;
obtaining 3-dimensional (3D) scan data for a physical part manufactured from the part design;
extracting, from the 3D scan data, a manufactured geometry of the physical part manufactured from the part design; and
generating an adjusted toolpath for the physical part to account for the manufactured geometry extracted from the 3D scan data.

2. The method of claim 1, wherein the 3D scan data comprises a representation of the physical part in the form of a point cloud; and
wherein extracting the manufactured geometry from the 3D scan data comprises:
aligning the point cloud to a same orientation as the CAD model;
filtering points in the point cloud outside a threshold distance from the nominal toolpath to obtain a filtered point cloud; and
performing a curve fitting operation on the filtered point cloud to determine the manufactured geometry.

3. The method of claim 1, further comprising:
determining an interest region on the nominal toolpath at which a defect in the part design could potentially occur during manufacture; and
controlling a scan of the physical part such that 3D scan data at the interest region is captured at a higher data resolution than at other non-interest regions on the nominal toolpath.

4. The method of claim 3, wherein determining the interest region comprises:
identifying a user-specified interest region on the nominal toolpath;
performing statistical analysis on part geometries and defect locations of other part designs to determine a probabilistic defect location as the interest region; or
a combination of both.

5. The method of claim 3, wherein determining the interest region comprises:
providing training data comprising part geometries and defect locations of other part designs to train a neural network; and
inputting the part design to the neural network to identify the interest region.

6. The method of claim 1, wherein extracting the manufactured geometry from the 3D scan data comprises generating an as-manufactured CAD representation of the part design from the 3D scan data.

7. The method of claim 6, wherein generating the as-manufactured CAD representation of the part design from the 3D scan data comprises:
extracting feature portions of the 3D scan data that correspond to portions of the CAD model along the nominal toolpath; and
performing a curve fitting operation on the extracted feature portions of the 3D scan data to determine the manufactured geometry.

8. A system comprising:
a data access engine configured to:
access a computer-aided design (CAD) model of a part design and a computer-aided manufacturing (CAM) setup for the part design, the CAM setup including a nominal toolpath specified through the CAD model for performing a finishing operation for the part design; and
obtain 3-dimensional (3D) scan data for a physical part manufactured from the part design; and
a toolpath adjustment engine configured to:
extract, from the 3D scan data, a manufactured geometry of the physical part manufactured from the part design; and
generate an adjusted toolpath for the physical part to account for the manufactured geometry extracted from the 3D scan data.

9. The system of claim 8, wherein the 3D scan data comprises a representation of the physical part in the form of a point cloud; and
wherein the toolpath extraction engine is configured to extract the manufactured geometry from the 3D scan data by:
aligning the point cloud to a same orientation as the CAD model;
filtering points in the point cloud outside a threshold distance from the nominal toolpath to obtain a filtered point cloud; and
performing a curve fitting operation on the filtered point cloud to determine the manufactured geometry.

10. The system of claim 8, wherein the data access engine is further configured to:
determine an interest region on the nominal toolpath at which a defect in the part design could potentially occur during manufacture; and
control a scan of the physical part such that 3D scan data at the interest region is captured at a higher data resolution than at other non-interest regions on the nominal toolpath.

11. The system of claim 10, wherein the data access engine is configured to determine the interest region by:
identifying a user-specified interest region on the nominal toolpath;
performing statistical analysis on part geometries and defect locations of other part designs to determine a probabilistic defect location as the interest region; or
a combination of both.

12. The system of claim 10, wherein the data access engine is configured to determine the interest region by:
providing training data comprising part geometries and defect locations of other part designs to train a neural network; and
inputting the part design to the neural network to identify the interest region.

13. The system of claim 8, wherein the toolpath adjustment engine is configured to extract the manufactured geometry from the 3D scan data by generating an as-manufactured CAD representation of the part design from the 3D scan data.

14. The system of claim 13, wherein the toolpath adjustment engine is configured to generate the as-manufactured CAD representation by:

extracting feature portions of the 3D scan data that correspond to portions of the CAD model along the nominal toolpath; and performing a curve fitting operation on the extracted feature portions of the 3D scan data to determine the manufactured geometry.

15. A non-transitory machine-readable medium comprising instructions that, when executed by a processor, cause a computing system to:

access a computer-aided design (CAD) model of a part design and a computer-aided manufacturing (CAM) setup for the part design, the CAM setup including a nominal toolpath specified through the CAD model for performing a finishing operation for the part design;

obtain 3-dimensional (3D) scan data for a physical part manufactured from the part design;

extract, from the 3D scan data, a manufactured geometry of the physical part manufactured from the part design; and generate an adjusted toolpath for the physical part to account for the manufactured geometry extracted from the 3D scan data.

16. The non-transitory machine-readable medium of claim 15, wherein the 3D scan data comprises a representation of the physical part in the form of a point cloud; and wherein the instructions, when executed, cause the computing system to extract the manufactured geometry from the 3D scan data by:

aligning the point cloud to a same orientation as the CAD model;

filtering points in the point cloud outside a threshold distance from the nominal toolpath to obtain a filtered point cloud; and performing a curve fitting operation on the filtered point cloud to determine the manufactured geometry.

17. The non-transitory machine-readable medium of claim 15, wherein the instructions, when executed, further cause the computing system to:

determine an interest region on the nominal toolpath at which a defect in the part design could potentially occur during manufacture; and control a scan of the physical part such that 3D scan data at the interest region is captured at a higher data resolution than at other non-interest regions on the nominal toolpath.

18. The non-transitory machine-readable medium of claim 17, wherein the instructions, when executed, cause the computing system to determine the interest region by:

identifying a user-specified interest region on the nominal toolpath;

performing statistical analysis on part geometries and defect locations of other part designs to determine a probabilistic defect location as the interest region; or a combination of both.

19. The non-transitory machine-readable medium of claim 17, wherein the instructions, when executed, cause the computing system to determine the interest region by:

providing training data comprising part geometries and defect locations of other part designs to train a neural network; and inputting the part design to the neural network to identify the interest region.

20. The non-transitory machine-readable medium of claim 15, wherein the instructions, when executed, cause the computing system to extract the manufactured geometry from the 3D scan data by:

generating an as-manufactured CAD representation of the part design from the 3D scan data, including by:

extracting feature portions of the 3D scan data that correspond to portions of the CAD model along the nominal toolpath; and performing a curve fitting operation on the extracted feature portions of the 3D scan data to determine the manufactured geometry.

\* \* \* \* \*